(12) United States Patent
Nishimura et al.

(10) Patent No.: US 9,669,787 B2
(45) Date of Patent: Jun. 6, 2017

(54) SHOCK-ABSORBING MECHANISM (71) Applicant: TOYOTA SHATAI KABUSHIKI KAISHA, Aichi (JP)

(72) Inventors: Takuya Nishimura, Aichi (JP); Toshihisa Miura, Aichi (JP)

(73) Assignee: TOYOTA SHATAI KABUSHIKI KAISHA, Aichi-ken (JP)

( * ) Notice: Subject to any disclaimer, the term of this patent is extended or adjusted under 35 U.S.C. 154(b) by 50 days.

(21) Appl. No.: 14/442,331

(22) PCT Filed: Nov. 14, 2013

(86) PCT No.: PCT/JP2013/080780
§ 371 (c)(1),
(2) Date: May 12, 2015

(87) PCT Pub. No.: WO2014/077314
PCT Pub. Date: May 22, 2014

(65) Prior Publication Data
US 2016/0272137 A1    Sep. 22, 2016

(30) Foreign Application Priority Data

Nov. 19, 2012  (JP) ................... 2012-253209

(51) Int. Cl.
*B60R 19/00* (2006.01)
*B60R 19/34* (2006.01)
*F16F 7/12* (2006.01)
*F16F 7/00* (2006.01)

(52) U.S. Cl.
CPC .............. *B60R 19/34* (2013.01); *F16F 7/003* (2013.01); *F16F 7/12* (2013.01)

(58) Field of Classification Search
CPC .............. B60R 19/34; F16F 7/12; F16F 7/003
USPC ............... 293/132, 133; 296/187.03, 187.09, 296/187.11; 188/377
See application file for complete search history.

(56) References Cited

U.S. PATENT DOCUMENTS

| | | | | |
|---|---|---|---|---|
| 3,797,873 A | * | 3/1974 | Cook | B60R 19/36 188/268 |
| 5,875,875 A | * | 3/1999 | Knotts | B60R 19/34 188/268 |
| 8,136,855 B2 | * | 3/2012 | Toneatti | B60R 19/18 293/133 |

FOREIGN PATENT DOCUMENTS

| | | |
|---|---|---|
| DE | 196 16 944 A1 | 10/1997 |
| JP | 6-171443 A | 6/1994 |
| JP | 2001-182769 A | 7/2001 |

(Continued)

*Primary Examiner* — Joseph D Pape
(74) *Attorney, Agent, or Firm* — Christensen, Fonder, Dardi & Herbert PLLC (57) ABSTRACT

A shock-absorbing mechanism of the present invention may include a cylindrical member that is configured to axially receive a collision load applied thereto via a load-receiving member and to be axially deformed due to the collision load, and a load absorbing member that is received in the cylindrical member so as to be compressed with the cylindrical member when the collision load is applied thereto and that is capable of expanding from its compressed condition by a certain amount in a restoring direction when the collision load is released, wherein a pressing portion of a frame member has a pressing portion for axially pressing the load absorbing member when the collision load is applied thereto has a space which a portion of the compressed load absorbing member enters.

4 Claims, 10 Drawing Sheets

(56) References Cited

FOREIGN PATENT DOCUMENTS

| | | |
|---|---|---|
| JP | 2002-513894 A | 5/2002 |
| JP | 2005-162061 A | 6/2005 |
| JP | 2012-132552 A | 7/2012 |
| JP | 2012-218712 A | 11/2012 |
| WO | WO 99/57455 A1 | 11/1999 |

* cited by examiner

FIG. 12
PRIOR ART

SHOCK-ABSORBING MECHANISM

PRIORITY CLAIM

The present application is a National Phase entry of PCT Application No. PCT/JP2013/080780, filed Nov. 14, 2013, which claims priority from Japanese Patent Application No. 2012-253209, filed Nov. 19, 2012, the disclosures of which are hereby incorporated by reference herein in their entirety.

TECHNICAL FIELD

The present invention relates to shock-absorbing mechanisms that are configured to be capable of receiving a collision load generated in the event of a vehicle collision or other such accidents and capable of absorbing the collision load.

BACKGROUND ART

Figure 11:
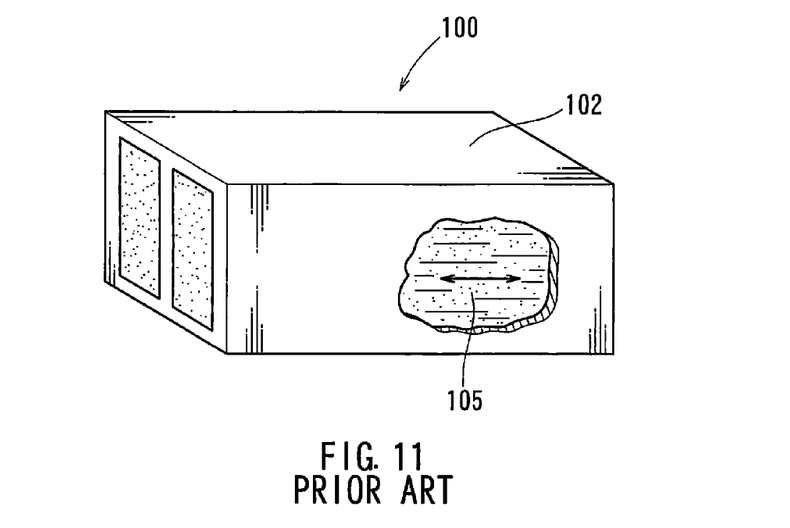
FIG. 11 is a perspective view of one of conventional shock-absorbing mechanisms.

An art relating to shock-absorbing members that are configured to be capable of receiving a collision load generated in the event of a vehicle frontal collision or other such accidents and capable of absorbing the collision load is described in JP2001-182769A. The shock-absorbing members 100 described in JP2001-182769A are shock-absorbing members that are used in crushable boxes of a vehicle or other such members. As shown in FIG. 11, the shock-absorbing members 100 are composed of rectangular cylindrical-shaped metal hollow members 102 and wood members 105 that are respectively received within the hollow members 102. In the shock-absorbing members 100, proximal end portions of the hollow members 102 are respectively connected to front ends of right and left side members 115 (FIG. 12) of the vehicle while distal end portions of the hollow members 102 are connected to a rear surface of a front bumper 117. Therefore, when the collision load is applied to the shock-absorbing members 100 via the front bumper 117 by, for example, the frontal collision of the vehicle, the hollow members 102 and the wood members 105 can be axially compressed. As a result, the collision load can be absorbed, so that the collision load applied to the side members 115 can be reduced.

SUMMARY OF THE INVENTION

Figure 12:
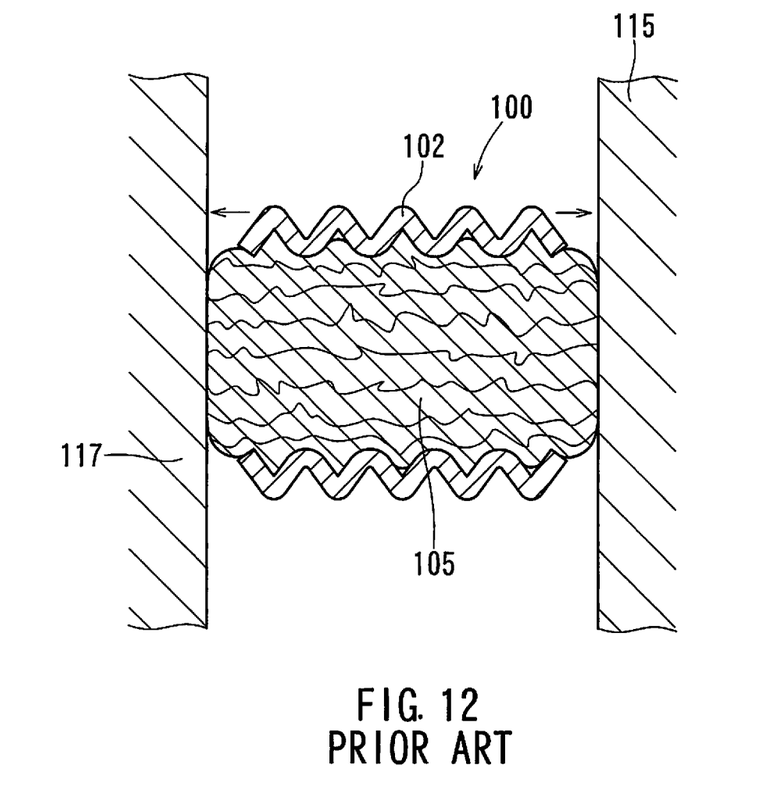
FIG. 12 is a transverse sectional view of one of the conventional shock-absorbing mechanisms, which illustrates an operation thereof.

As shown in FIG. 12, in the shock-absorbing members 100 described above, when the collision load is released after the hollow members 102 and the wood members 105 are axially compressed by the collision load applied thereto, the compressed wood members 105 can be slightly restored, so as to be axially expanded. Conversely, the metal hollow members 102 cannot substantially be restored from their compressed conditions. As a result, the proximal end portions and the distal end portions of the hollow members 102 can be separated from the front bumper 117 and the side members 115 due to axial expansion of the wood members 105. Therefore, the shock-absorbing members 100 can be come off from between the front bumper 117 and the side members 115 after the frontal collision of the vehicle. In a condition in which the shock-absorbing members 100 is come off from between the front bumper 117 and the side members 115, when a following collision happens successively to the first collision, a collision load absorbing capability of the shock-absorbing members 100 at the time of the following collision may be reduced.

Therefore, there is a need to provide an improved shock-absorbing members.

In one aspect of the present invention, a shock-absorbing mechanism disposed between a load-receiving member of a vehicle for directly receiving a collision load and a frame member of the vehicle in order to reduce the collision load applied to the frame member is provided. The load-receiving mechanism may include a cylindrical member that is configured to axially receive the collision load applied thereto via the load-receiving member so as to be axially compressed, and a load absorbing member that is received in the cylindrical member so as to be axially compressed with the cylindrical member when the collision load is applied thereto and that is capable of expanding from its compressed condition by a certain amount in a restoring direction when the collision load is released. At least one of a pressing portion of the load-receiving member and a pressing portion of the frame member for axially pressing the load absorbing member when the collision load is applied thereto has a space which a portion of the compressed load absorbing member enters.

According to the aspect of the present invention, when the cylindrical member and the load absorbing member are compressed due to the collision load applied thereto, the compressed load absorbing member can enter the space formed in the pressing portion of the at least one of the load-receiving member and the frame member. Upon release of the collision load, the load absorbing member may expand from its compressed condition by a certain amount in a restoring direction. Therefore, even if the cylindrical member is disconnected from the load-receiving member and the frame member due to expansion of the load absorbing member after the collision load is released, both of the load absorbing member and the cylindrical member can be prevented from being come off from between the load-receiving member and the frame member because the load absorbing member enters the space. Therefore, even when a following collision successively happens, the collision load caused by the following collision can be received by the load absorbing member and others.

In another aspect of the present invention, the space comprises a recessed portion in which the load absorbing member fits. Therefore, both of the load absorbing member and the cylindrical member can be further prevented from being come off from between the load-receiving member and the frame member.

In another aspect of the present invention, the pressing portion has a pressing surface which an axial end surface of the load absorbing member before compression contacts, and wherein the recessed portion is formed in a portion of the pressing surface. According to this structure, when the load absorbing member is compressed due to the collision load applied thereto, a portion of the end surface of the load absorbing member can be fitted in the recessed portion formed in the pressing surface. Therefore, the load absorbing member can be reliably held even if the recessed portion may be relatively small.

In another aspect of the present invention, the pressing portion has a recessed portion in which an axial end portion of the load absorbing member is received. Thus, the axial end portion of the load absorbing member is received in the recessed portion. Therefore, when the load absorbing member is compressed due to the collision load applied thereto, the load absorbing member can be prevented from falling down.

In another aspect of the present invention, the recessed portion has a projection formed in a bottom surface or a side surface thereof. Thus, when the load absorbing member is compressed, the axial end portion of the load absorbing member can be expanded radially outwardly with the aid of the projection, so as to be firmly fitted in the recessed portion.

In another aspect of the present invention, the pressing portion has a pressing surface which an axial end surface of the load absorbing member before compression contacts, and the pressing surface has an opening formed in a portion thereof such that a portion of the compressed load absorbing member is allowed to enter the space through the opening. Thus, a portion of the compressed load absorbing member may pass through the opening and fit in the opening, so that the load absorbing member and the cylindrical member can be prevented from being come off from between the load-receiving member and the frame member. In addition, a portion of the compressed load absorbing member may be escaped into the space through the opening. Therefore, the load absorbing member can be prevented from being fully compressed to the extent that the load absorbing member cannot further absorb the collision load. As a result, the load absorbing member can be continuously compressed while the collision load is applied thereto, so as to absorb the collision load.

In yet another aspect of the present invention, the pressing portion has a space in which an axial end portion of the load absorbing member is received, and the end portion of the load absorbing member is previously received in a portion of the space and is connected to the pressing portion via a connecting mechanism. That is, because the pressing portion and the end portion of the load absorbing member are connected to each other via the connecting mechanism, the load absorbing member and the cylindrical member can be prevented from being come off from between the load-receiving member and the frame member. Further, a portion of the compressed load absorbing member may be escaped into the space. Therefore, the load absorbing member can be prevented from being fully compressed to the extent that the load absorbing member cannot further absorb the collision load.

In still another aspect of the present invention, the load absorbing member comprises a wood member that is received in the cylindrical member while an axis direction of annual rings of the wood member corresponds to an axial direction of the cylindrical member. Thus, the load absorbing member can effectively receive the relatively large collision load.

DETAILED DESCRIPTION OF THE INVENTION

In the following, shock-absorbing mechanisms according to a first embodiment of the present invention will be described with reference to FIG. 1 to FIG. 6. Further, forward and backward, rightward and leftward, and upward and downward in the drawings respectively correspond to forward and backward, rightward and leftward, and upward and downward of a vehicle to which the shock-absorbing mechanisms are attached.

Figure 1:
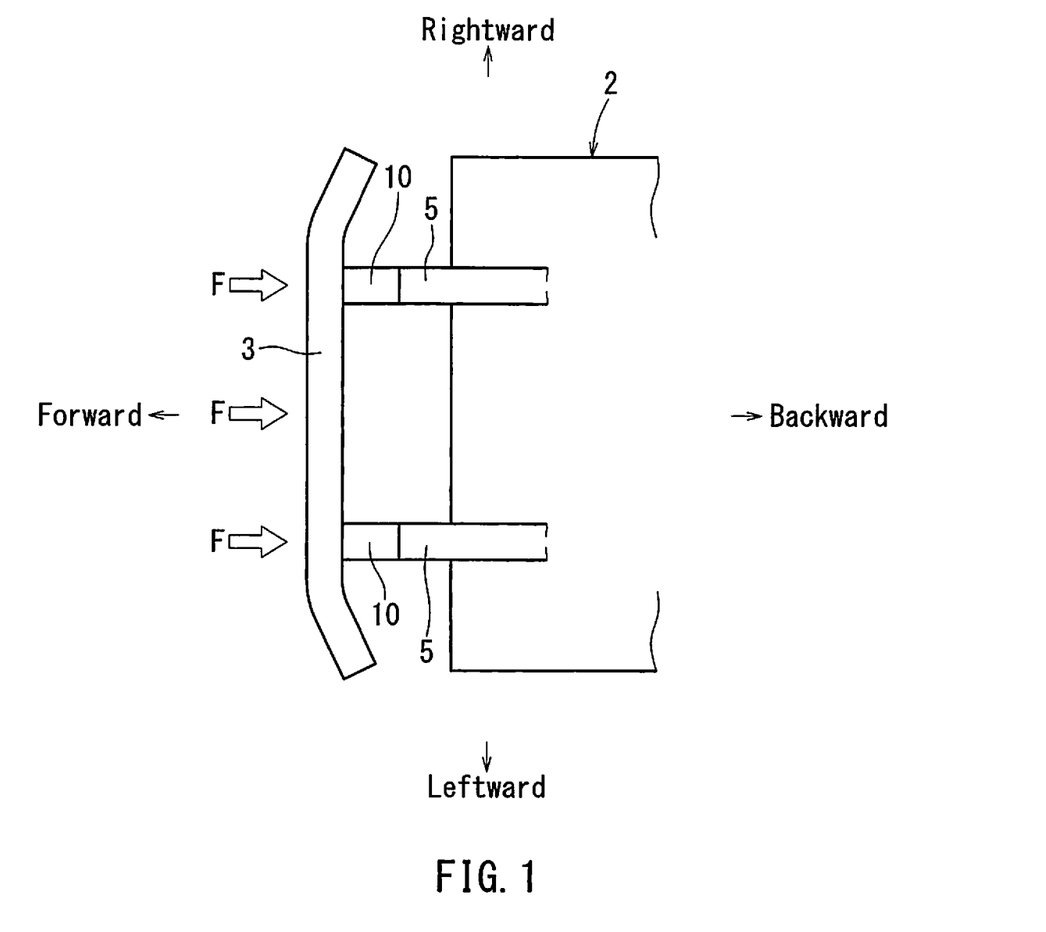
FIG. 1 is a schematic plan view of a vehicle front portion having shock-absorbing mechanisms according to a first embodiment of the present invention.
Figure 2:
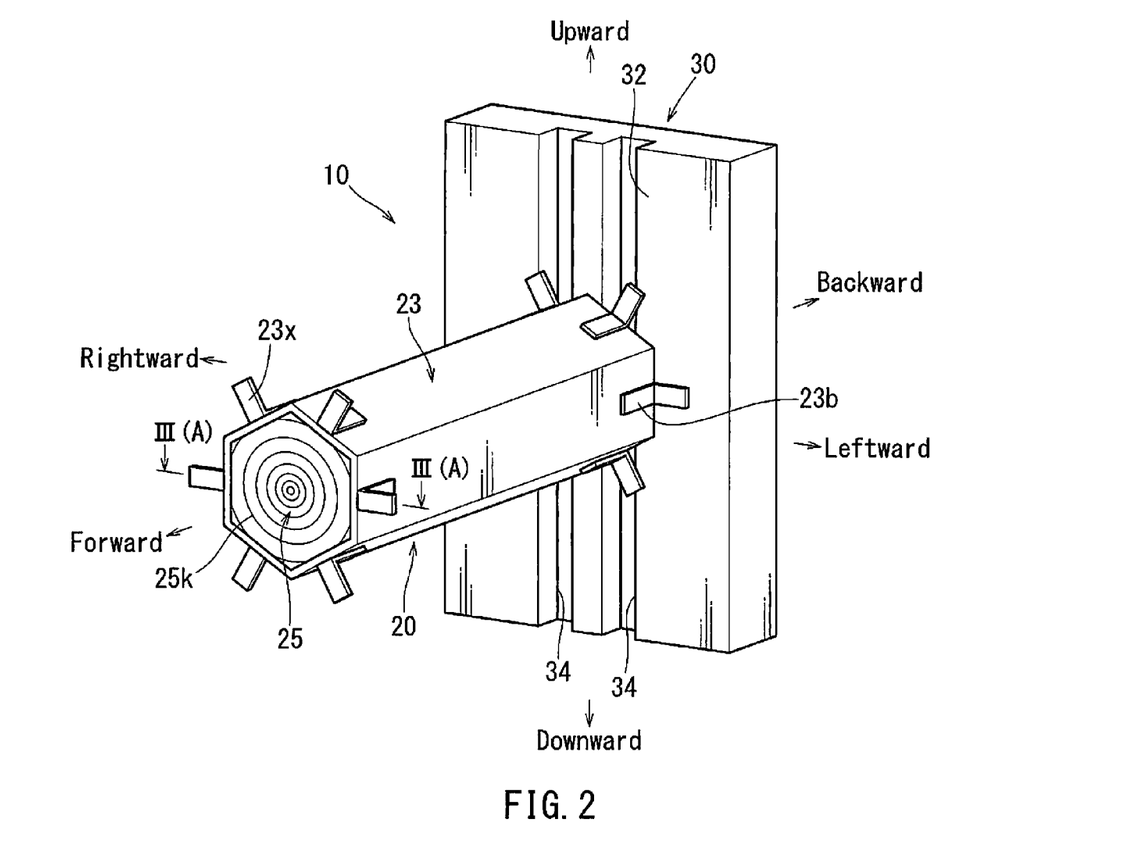
FIG. 2 is a perspective view of one of the shock-absorbing mechanisms according to the first embodiment of the present invention.
Figure 3A:
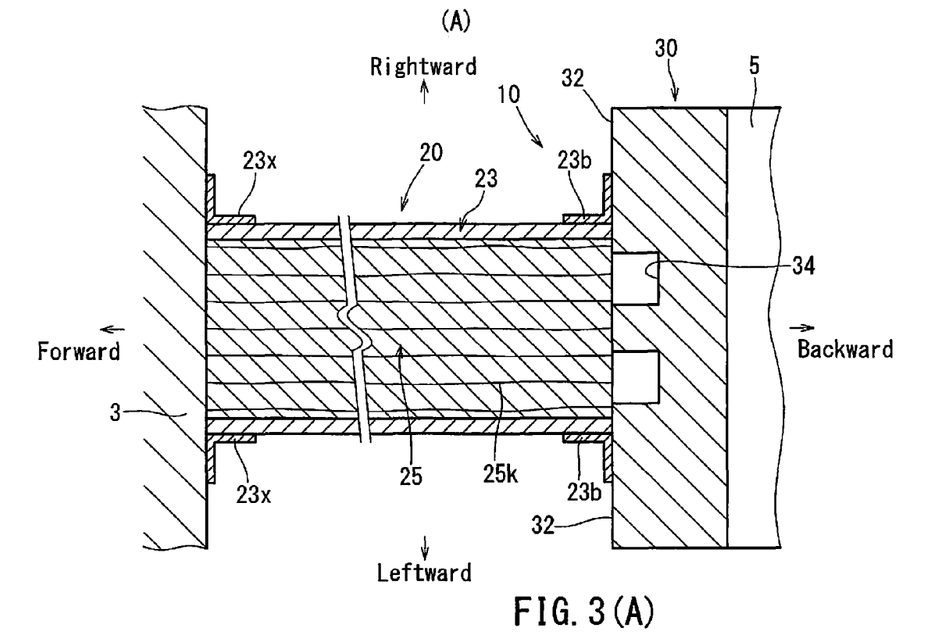
FIG. 3(A) is a transverse sectional view taken along line III(A)-III(A) of FIG. 2 of the present invention.
Figure 3B:
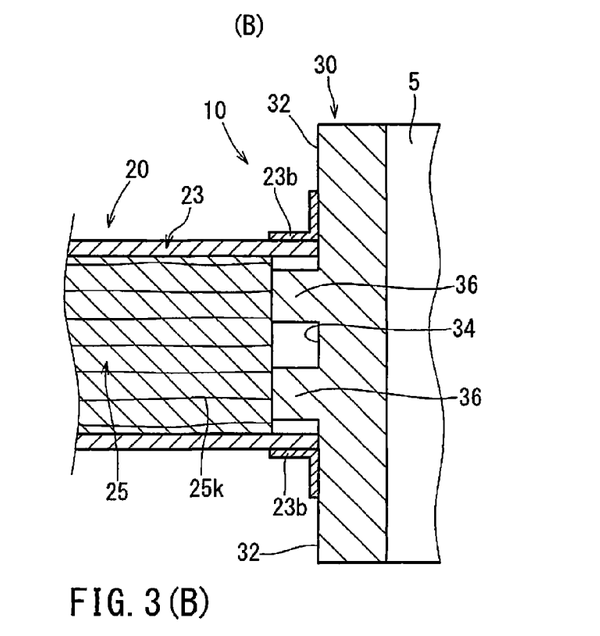
FIG. 3(B) is a transverse sectional view of one of shock-absorbing mechanisms according to a modified form of the present invention.

Shock-absorbing mechanisms 10 according to the present embodiment may be mechanisms that are configured to receive a collision load F generated in the event of a vehicle frontal collision and absorb the collision load F. As shown in FIG. 1, the shock-absorbing mechanisms 10 may be attached to crushable boxes that are disposed between a bumper reinforcement member 3 of a front bumper (not shown) and right and left side members 5 of a vehicle 2. The bumper reinforcement member 3 may be referred to as a load-receiving member. Further, the side members 5 may be referred to as a frame member. As shown in FIG. 2, FIG. 3(A) and FIG. 3(B), the shock-absorbing mechanisms 10 may respectively include pressure plate portions 30 attached to distal ends of the side members 5 and shock-absorbing portions 20 that function to absorb the collision load F.

As shown in FIG. 2 or other figures, the pressure plate portions 30 may respectively be rectangular thick plates that function to hold the shock-absorbing portions 20 at the distal ends of the side members 5 and to receive the collision load F via the shock-absorbing portions 20. The pressure plate portions 30 may respectively be connected to the distal ends of the side members 5 such that front surfaces or pressing surfaces 32 of the pressure plate portions 30 are parallel to a virtual plane perpendicular to a vehicle front-back direction. As shown in FIG. 3(A), a plurality of (two in FIG. 3(A))

vertically elongated linear grooves 34 may be formed in each of the pressing surfaces 32 of the pressure plate portions 30. The linear grooves 34 may be juxtaposed in a vehicle width direction. Each of the linear grooves 34 may have a rectangular shape in cross section and may be continuously extended between an upper end and a lower end of each of the pressure plate portions 30. Further, the linear grooves 34 may preferably be formed in each of the pressing surfaces 32 of the pressure plate portions 30 by cutting or other such methods. Further, a width of each of the linear grooves 34 may preferably be slightly narrowed toward an opening. Further, as shown in FIG. 3(B), in a modified form, a pair of vertically elongated ribs 36 may be formed in each of the pressing surfaces 32 of the pressure plate portions 30 such that a linear groove 34 is defined between the ribs 36.

As shown in FIG. 2, a proximal end of each of the shock-absorbing portions 20 may be connected to a central portion of each of the pressing surfaces 32 of the pressure plate portions 30 while straddling the plurality of linear grooves 34. The shock-absorbing portions 20 may respectively be connected to the pressing surfaces 32 of the pressure plate portions 30 so as to protrude forward from the pressing surfaces 32. Conversely, a distal end of each of the shock-absorbing portions 20 may be secured to a rear surface of the bumper reinforcement member 3.

As shown in FIG. 2, FIG. 3(A) and FIG. 3(B), the shock-absorbing portions 20 may respectively have cylindrical members 23 and wood members 25 received in the cylindrical members 23. The shock-absorbing portions 20 may be configured to receive the collision load F in axial directions of the shock-absorbing portions 20. That is, the shock-absorbing portions 20 may respectively be secured to the pressing surfaces 32 of the pressure plate portions 30 such that central axes of the shock-absorbing portions 20 are perpendicular to the pressing surfaces 32. The cylindrical members 23 of the shock-absorbing portions 20 may be extrusion molded articles using, for example, aluminum alloys. As shown in FIG. 2, each of the cylindrical members 23 may have a regular hexagonal shape in cross section taken along a line perpendicular to a central axis thereof. However, each of the cylindrical members 23 may be modified to have a rectangular shape, a regular pentagonal shape or other polygonal shapes in cross section. Further, each of the cylindrical members 23 may have a length of about 70 mm in an axial direction thereof, a width (a diameter of an circumscribed circle of a hexagon) of about 28 mm, and a thickness of about 0.8 mm.

As shown in FIG. 2, FIG. 3(A), FIG. 3(B) and other figures, each of the wood members 25 constituting the shock-absorbing portions 20 may have the same transverse cross-sectional shape (the hexagonal shape) as a cross-sectional shape (a transverse cross-sectional shape) of each of the cylindrical members 23 in a direction perpendicular to the central axis. Each of the wood members 25 may have the substantially same length (approximately 70 mm) as an axial length of each of the cylindrical members 23. Each of the wood members 25 may have a hexagonal columnar shape. Further, each of the wood members 25 may be shaped such that an axis direction of annual rings $25k$ thereof may correspond to a longitudinal direction (an axial direction) thereof. Therefore, in a condition in which the wood members 25 are respectively introduced into the cylindrical members 23, the axis direction of the annual rings $25k$ of each of the wood members 25 may substantially be identical to the axial direction of each of the cylindrical members 23. That is, the wood members 25 may respectively be received in the cylindrical members 23 while the axis direction of the annual rings $25k$ of each of the wood members 25 corresponds to the axial direction of each of the cylindrical members 23. Thus, the wood members 25 can be axially strengthened, so as to receive the large collision load F. Cedar wood members may preferably be used as the wood members 25. Further, a width (a diameter of an circumscribed circle of a hexagon) of each of the wood members 25 may be set to a desired value (about 28 mm) such that a clearance of about 0.25 mm is formed between an outer circumferential surface of each of the wood members 25 and an inner circumferential surface of each of the cylindrical members 23.

In order to attach the shock-absorbing mechanisms 10 to the vehicle, first, the right and left pressure plate portions 30 may be connected to the distal ends of the right and left side members 5. Next, the right and left shock-absorbing portions 20 may respectively be secured to the pressing surfaces 32 of the right and left pressure plate portions 30. That is, as shown in FIG. 3(A), the shock-absorbing portions 20 may respectively be positioned on centers of the pressing surfaces 32 of the pressure plate portions 30. Subsequently, rear end surfaces of the cylindrical members 23 and rear end surfaces of the wood members 25 may respectively be placed in contact with the pressing surfaces 32 of the pressure plate portions 30. Further, as shown in FIG. 3(B), in the modified form, the rear end surfaces of the cylindrical members 23 of the shock-absorbing portions 20 may respectively be placed in contact with the pressing surfaces 32 of the pressure plate portions 30 while the rear end surfaces of the wood members 25 of the shock-absorbing portions 20 may respectively be placed in contact with front end surfaces of the ribs 36 of the pressure plate portions 30. Thereafter, in this condition, as shown in FIG. 2, rear end portions of the cylindrical members 23 may respectively be connected to the pressing surfaces 32 of the pressure plate portions 30 using brackets $23b$ or other such devices. Thus, the wood members 25 may respectively be positioned on the pressing surfaces 32 while straddling the linear grooves 34 formed in the pressing surfaces 32.

Next, front end surfaces of the right and left cylindrical members 23 and front end surfaces of the right and left wood members 25 may respectively be placed in contact with the rear surface of the bumper reinforcement member 3. Thereafter, front end portions of the cylindrical members 23 may be secured to the rear surface of the bumper reinforcement member 3 using brackets $23x$ or other such devices. Further, when the pressure plate portions 30 and the bumper reinforcement member 3 are made from, for example, aluminum or other such materials, the cylindrical members 23 can be directly welded to the pressing surfaces 32 of the pressure plate portions 30 and the rear surface of the bumper reinforcement member 3.

Figure 4A:
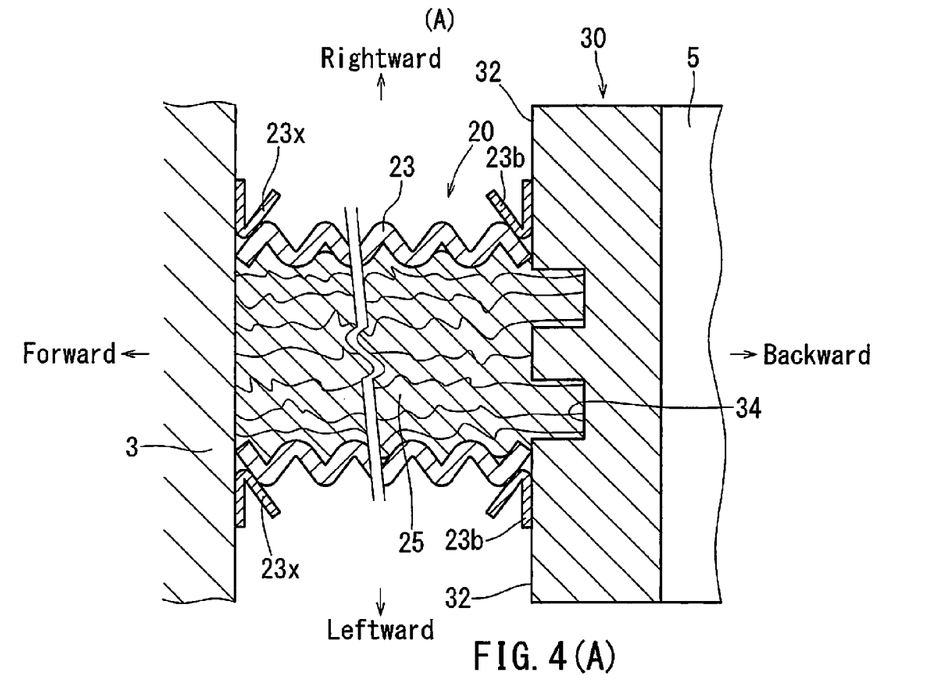
FIG. 4(A) is a transverse sectional view of one of the shock-absorbing mechanisms of the present invention, which illustrates an operation thereof.
Figure 4B:
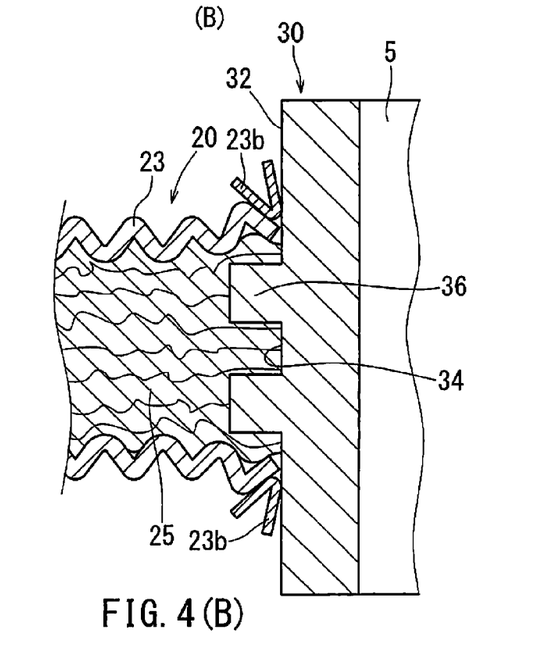
FIG. 4(B) is a transverse sectional view of one of the shock-absorbing mechanisms of the present invention, which illustrates the operation thereof.

Next, an operation of the shock-absorbing mechanism 10 will be described with reference to FIG. 4(A) and FIG. 4(B). When the collision load F is applied to the bumper reinforcement member 3 by the frontal collision of the vehicle 2, the collision load F may be axially applied to the cylindrical members 23 and the wood members 25 of the shock-absorbing portions 20. That is, the shock-absorbing portions 20 may be subjected to compression forces equal to the collision load F from axially both sides via the bumper reinforcement member 3 and the pressing surfaces 32 of the pressure plate portions 30 attached to the side members 5. As shown in FIG. 4(A) and FIG. 4(B), when the collision load F exceeds an allowable load value of the wood members 25 and the cylindrical members 23, the wood members 25 and the cylindrical members 23 may be axially compressed. As a result, the collision load F can be absorbed by the wood members 25 and the cylindrical members 23, so that the collision load F applied to the side members 5 can be reduced. At this time, portions of the compressed wood members 25 may be pressed into the linear grooves 34 formed in the pressing surfaces 32 of the pressure plate portions 30.

Thereafter, when the collision load F is released by moving the vehicle 2, the compressed wood members 25 can be restored and expanded by certain amounts in restoring directions. Conversely, the aluminum cylindrical members 23 cannot substantially be restored from their compressed conditions. As a result, the front end portions and the rear end portions of the cylindrical members 23 can respectively be spaced from the bumper reinforcement member 3 and the pressure plate portions 30 attached to the side members 5. That is, the cylindrical members 23 may respectively be separated from the bumper reinforcement member 3 and the pressure plate portions 30 attached to the side members 5. However, because portions of the compressed wood members 25 are pressed into the linear grooves 34 formed in the pressing surfaces 32 of the pressure plate portions 30, when the compressed wood members 25 are expanded in the restoring direction, portions of the wood members 25 can be securely fitted in the linear grooves 34. As a result, even when the collision load F is released, the shock-absorbing members 20 can be prevented from being come off from between the bumper reinforcement member 3 and the pressure plate portions 30 attached to the side members 5. Therefore, even when a following collision happens successively to the first collision, the collision load F caused by the following collision can be received by the shock-absorbing members 20. Further, the wood members 25 may be referred to as load absorbing members. Further, the pressure plate portions 30 may be referred to as pressing portions. Further, the linear grooves 34 formed in the pressing surfaces 32 may be referred to as recessed portions.

According to the shock-absorbing mechanism 10 of the present embodiment, when the cylindrical members 23 and the wood members 25 (the load absorbing members) are compressed due to the collision load F applied thereto, the compressed wood members 25 may be fitted in the linear grooves 34 (the recessed portions) formed in the pressure plate portions 30 (the pressing portions) attached to the side members 5. Thereafter, when the wood members 25 are expanded from their compressed conditions by the certain amounts in the restoring directions upon release of the collision load F, the wood members 25 can be further securely fitted in the linear grooves 34. Therefore, even if the cylindrical members 23 are disconnected from the bumper reinforcement member 3 and the side members 5 due to expansion of the wood members 25 after the collision load F is released, both of the wood members 25 and the cylindrical members 23 can be prevented from being come off from between the bumper reinforcement member 3 and the side members 5 because the wood members 25 are fitted in the linear grooves 34. Further, because portions of the end surfaces of the wood members 25 can be fitted in the linear grooves 34 formed in the pressing surfaces 32 when the wood members 25 are compressed due to the collision load F, the wood members 25 can be reliably held even if the linear grooves 34 may be small in width.

In the present embodiment, the plurality of linear grooves 34 (the recessed portions) are vertically formed in each of the pressing surfaces 32 of the pressure plate portions 30 (the pressing portions). However, the linear grooves 34 may be transversely formed in each of the pressing surfaces 32. Further, the linear grooves 34 may have a grid-shaped structure that is composed of vertically elongated grooves and transversely elongated grooves. Further, instead of the linear grooves 34, a plurality of recessed portions each having a circular or polygonal shape in plan may be formed in each of the pressing surfaces 32.

In the present embodiment, the linear grooves 34 are formed in the pressing surfaces 32 of the pressure plate portions 30 by cutting. However, the linear grooves 34 can be formed by press forming. That is, the pressure plate portions 30 may be press formed corrugated steel plates each having a plurality of grooves each of which has a rectangular shape in cross section.

Figure 5A:
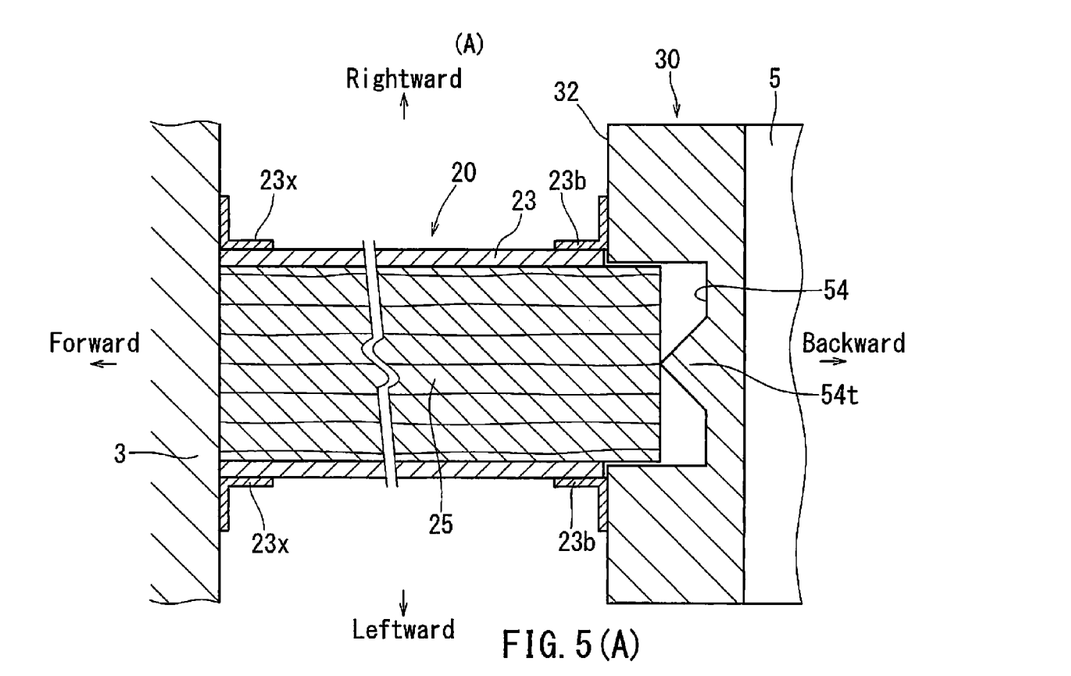
FIG. 5(A) is a transverse sectional view of one of shock-absorbing mechanisms according to a modified form of the first embodiment of the present invention.
Figure 5B:
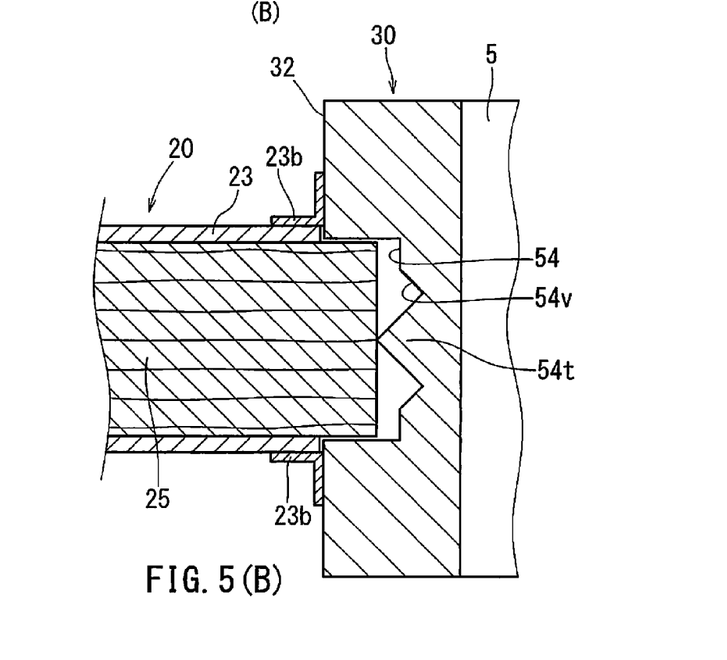
FIG. 5(B) is a transverse sectional view of one of shock-absorbing mechanisms according to a modified form of the first embodiment of the present invention.

Further, in the present embodiment, each of the pressing surfaces 32 of the pressure plate portions 30 has the linear grooves 34 into which portions of the compressed wood members 25 can be fitted. However, as shown in FIG. 5(A) and FIG. 5(B), instead of the linear grooves 34, a recessed portion 54 can be formed in each of the pressing surfaces 32 so as to respectively receive one axial end portion of each of the wood members 25. In this case, the recessed portion 54 may preferably have a projection 54t formed in a central portion thereof. According to this structure, when the wood members 25 are compressed, one axial end portion of each of the wood members 25 can be deformed radially outwardly with the aid of the projection 54t, so as to be firmly fitted into the recessed portion 54. Further, as shown in FIG. 5(A), the projection 54t can be simply formed in a central portion of a bottom surface of the recessed portion 54. Instead, as shown in FIG. 5(B), the projection 54t can be formed in the central portion of the bottom surface of the recessed portion 54 with an annular groove 54v having a V-shape in cross section while it is surrounded by the annular groove 54v. Thus, one axial end portion of each of the wood members 25 can be received in the recessed portion 54 formed in each of the pressing surfaces 32 of the pressure plate portions 30. Therefore, when the wood members 25 are compressed due to the collision load F applied thereto, the wood members 25 and the related members can be prevented from falling down.

Figure 6:
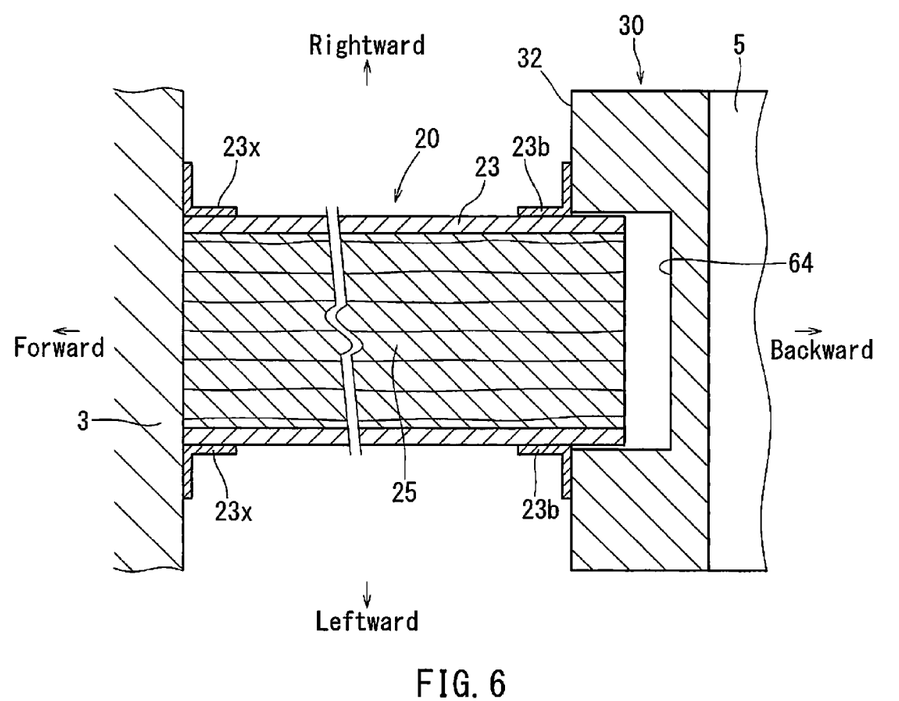
FIG. 6 is a transverse sectional view of one of shock-absorbing mechanisms according to a modified form of the first embodiment of the present invention.

Further, as shown in FIG. 6, a recessed portion 64 can be formed in each of the pressing surfaces 32 of the pressure plate portions 30 so as to receive both of one axial end portion of each of the wood members 25 and one axial end portion of each of the cylindrical members 23.

Further, in the present embodiment, the wood members 25 are exemplified as the load absorbing members. However, metallic foamed materials can be used instead of the wood members 25.

Further, in the present embodiment, the pressure plate portions 30 are attached to the side members 5. However, the pressure plate portions 30 can be attached to the bumper reinforcement member 3. Further, the pressure plate portions 30 can be attached to both of the side members 5 and the bumper reinforcement member 3.

Further, a plurality of projected portions can be formed in the pressing surfaces 32 of the pressure plate portions 30 such that the compressed wood members 25 are introduced therebetween.

In the following, shock-absorbing mechanisms 70 according to a second embodiment of the present invention will be described with reference to FIGS. 7(A) to 10. For example, as shown in FIGS. 4(A) and (B), in a condition in which the wood members 25 constituting the shock-absorbing portions 20 are fully compressed, when the collision load F is further applied to the wood members 25, the collision load F cannot substantially be absorbed by the wood members 25. In the shock-absorbing mechanisms 70 according to the present embodiment, it is intended to prevent the wood members 25 constituting the shock-absorbing portions 20 from being fully compressed such that the wood members 25 can absorb the collision load F while the collision load F is applied to the wood members 25. Further, in the shock-absorbing mechanisms 70 according to the present embodiment, elements that are the same in the shock-absorbing mechanisms 10 according to the first embodiment will be identified by the same reference numerals and a detailed description of such elements may be omitted.

Figure 7A:
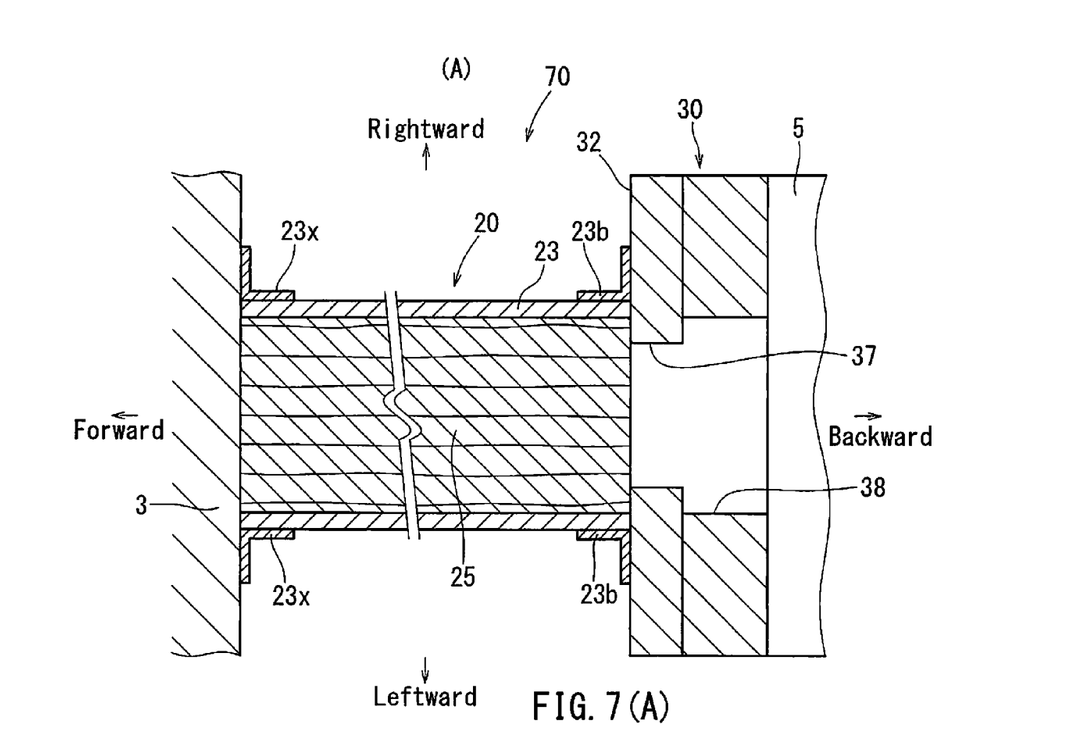
FIG. 7(A) is a transverse sectional view of one of shock-absorbing mechanisms according to a second embodiment of the present invention.

As shown in FIG. 7(A), in the shock-absorbing mechanisms 70, the pressure plate portions 30 attached to the side members 5 may respectively have square openings 37 formed in central portions thereof and spaces 38 positioned behind the square opening 37. The spaces 38 may be configured to permit entry of the compressed wood members 25. Similar to the wood members 25 of the shock-absorbing portions 20, each of the square openings 37 may have a square shape in cross section. Further, a square of each of the square openings 37 may have a length of side of 30 mm when a square of each of the wood members 25 has a length of side of 40 mm. Similar to the square openings 37, each of the spaces 38 may have a square shape in cross section. Further, a square of each of the spaces 38 may have a length of side greater than the length of side of the square of each of the square openings 37. Further, the wood members 25 and the cylindrical members 23 constituting the shock-absorbing portions 20 may respectively be secured to the pressing surfaces 32 of the pressure plate portions 30 so as to be positioned coaxially with the square openings 37 and the spaces 38 formed in the pressure plate portions 30 while matched with the same in cross-sectional shape. Further, portions of end surfaces of the shock-absorbing portions 20 and portions of the pressing surfaces 32 may form surface contacts therebetween.

Figure 7B:
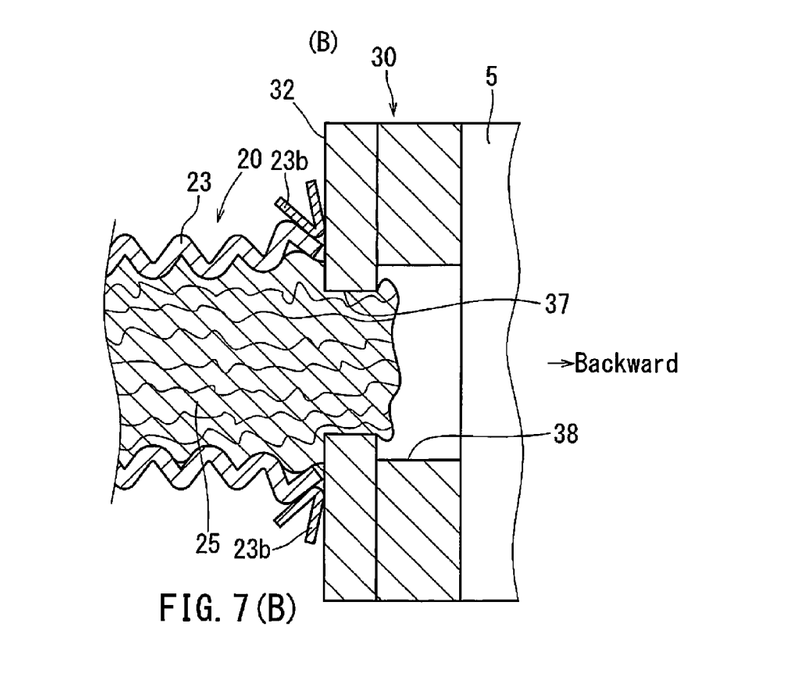
FIG. 7(B) is a transverse sectional view of one of shock-absorbing mechanisms according to the second embodiment of the present invention, which illustrates an operation thereof.

Therefore, as shown in FIG. 7(B), when the collision load F is axially applied to the cylindrical members 23 and the wood members 25 of the shock-absorbing portions 20 via the bumper reinforcement member 3, the cylindrical members 23 and the wood members 25 may be axially compressed. At this time, portions of the compressed wood members 25 may enter the spaces 38 through the square openings 37 formed in the pressure plate portions 30. Therefore, the wood members 25 can be prevented from being fully compressed to the extent that the wood member 25 cannot further absorb the collision load F. As a result, the wood members 25 can absorb the collision load F while the collision load F is applied thereto. Further, the compressed wood members 25 may be fitted in the square openings 37 formed in the pressure plate portions 30. Therefore, even when the collision load F is released, the shock-absorbing members 20 can be prevented from being come off from between the bumper reinforcement member 3 and the pressure plate portions 30 attached to the side members 5.

Figure 8:
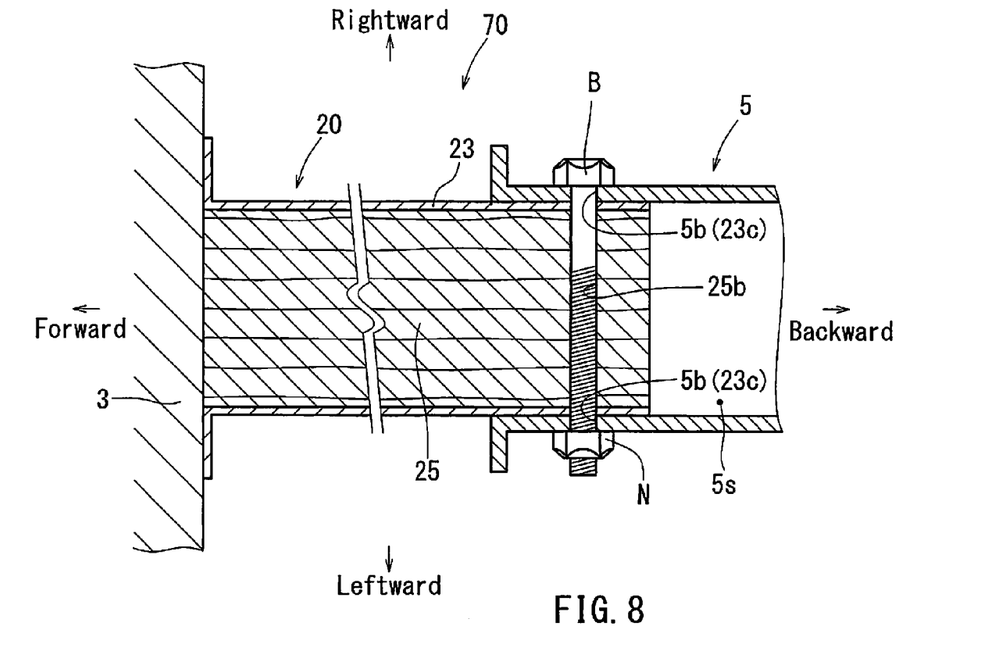
FIG. 8 is a transverse sectional view of one of shock-absorbing mechanisms according to a modified form of the second embodiment of the present invention.
Figure 9:
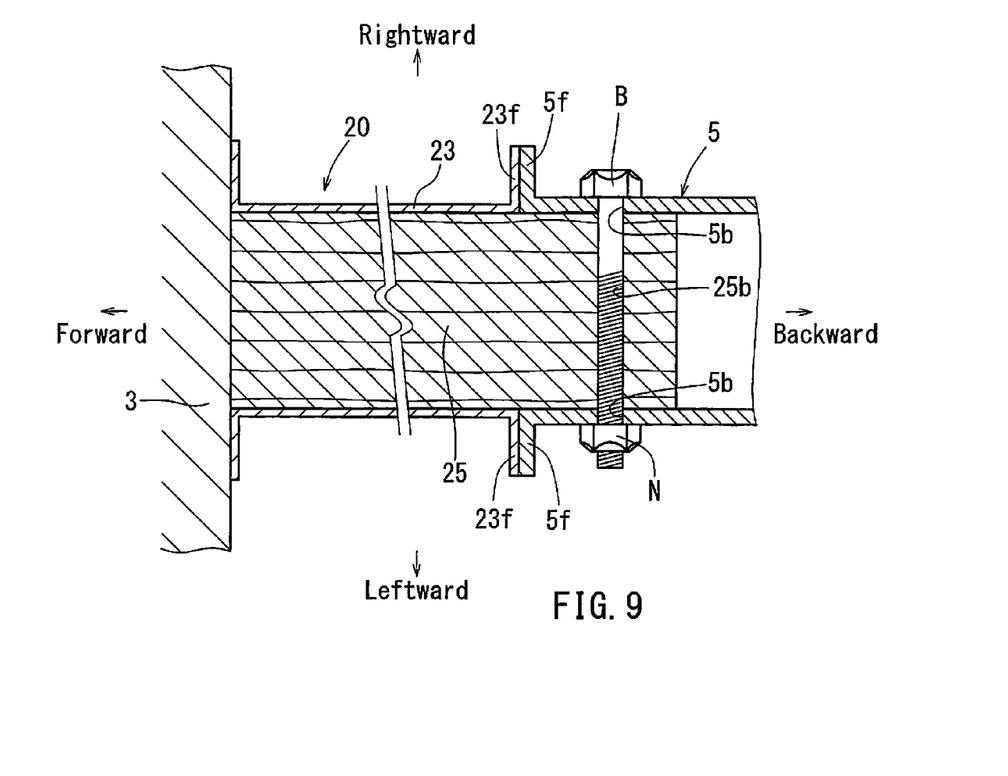
FIG. 9 is a transverse sectional view of one of shock-absorbing mechanisms according to a modified form of the second embodiment of the present invention.
Figure 10:
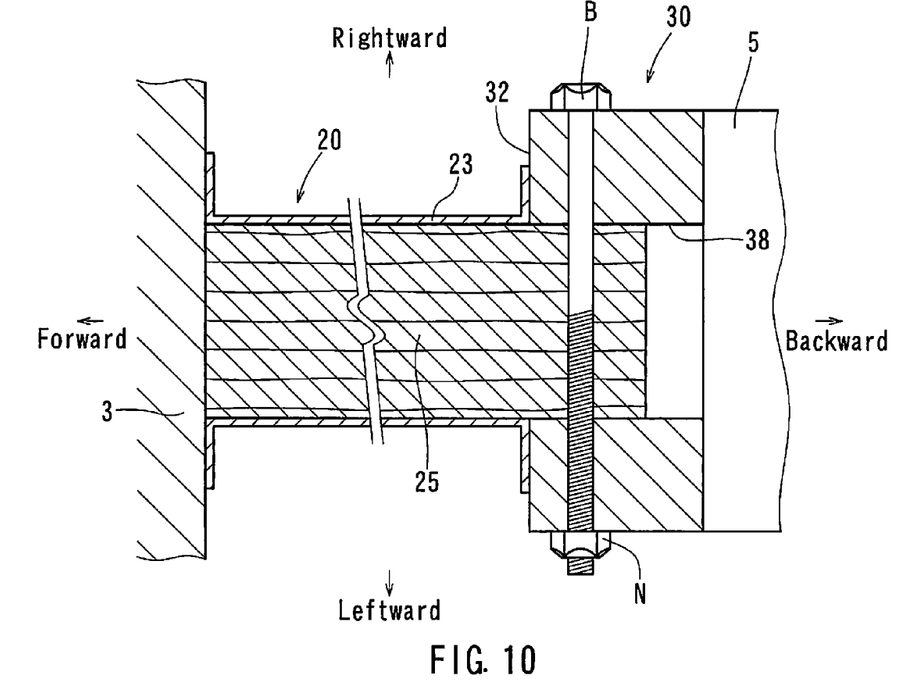
FIG. 10 is a transverse sectional view of one of shock-absorbing mechanisms according to a modified form of the second embodiment of the present invention.

FIGS. 8 to 10 respectively show shock-absorbing mechanisms 70 according to modified forms, each of which is shown by a transverse sectional view. In the shock-absorbing mechanisms 70 shown in FIG. 8, proximal end portions of the wood members 25 and the cylindrical members 23 constituting the shock-absorbing members 20 may be introduced into spaces 5s formed in front ends of the side members 5. The front ends of the side members 5 and the proximal end portions of the shock-absorbing members 20 (the wood members 25 and the cylindrical members 23) may respectively have bolt holes 5b, 23c and 25b that laterally pass therethrough in predetermined positions thereon. Bolts B may respectively be inserted into the bolt holes 5b, 23c and 25b. Further, nuts N may be attached to the bolts B, so that the side members 5 and the proximal end portions of the shock-absorbing members 20 received in the front ends of the side members 5 can be connected. The front ends of the side members 5 may respectively be referred to as the pressing portions. Further, the bolts B, the nuts N and others may be referred to as connecting mechanisms.

According to the structure described above, portions of the wood members 25 compressed by the collision load F may enter the spaces 5s formed in the side members 5. Therefore, the wood members 25 can be prevented from being fully compressed to the extent that the wood member 25 cannot further absorb the collision load F. Further, because the proximal end portions of the shock-absorbing members 20 are connected to the front ends of the side members 5 via the bolts B and the nuts N, the shock-absorbing members 20 can be prevented from being come off from between the bumper reinforcement member 3 and the side members 5.

In the example shown in FIG. 8, the wood members 25 and the cylindrical members 23 of the shock-absorbing members 20 may be introduced into the front ends of the side members 5. However, as shown in FIG. 9, only the wood members 25 can be introduced into the front ends of the side members 5 while flanged portions 23f formed in the cylindrical members 23 are connected to flanged portions 5f formed in the side members 5.

Further, as shown in FIG. 10, the pressure plate portions 30 respectively having the spaces 38 can be connected to the distal ends of the side members 5 while the proximal end portions of the shock-absorbing members 20 are received in the spaces 38 of the pressure plate portions 30. The shock-absorbing members 20 and the pressure plate portions 30 can be connected to each other via the bolts B and the nuts N.

The invention claimed is:

1. A shock-absorbing mechanism disposed between a load-receiving member of a vehicle for directly receiving a collision load and a frame member of the vehicle in order to reduce the collision load applied to the frame member, which mechanism includes a cylindrical member that is configured to axially receive the collision load applied thereto via the load-receiving member so as to be axially compressed, and a wood member that is received in the cylindrical member so as to be axially compressed with the cylindrical member when the collision load is applied thereto, the wood member being capable of expanding from its compressed condition by a certain amount in a restoring direction when the collision load is released, wherein the wood member is received in the cylindrical member while an axis direction of annual rings of the wood member corresponds to an axial direction of the cylindrical member, wherein at least one of the load-receiving member and the frame member has a pressing portion for axially pressing both of the cylindrical member and the wood member when the collision load is applied thereto, the pressing portion having a pressing surface which is placed in contact with axial end surfaces of the cylindrical member and the wood member before compression due to application of the collision load, wherein a recessed portion is formed in a portion of the pressing surface, wherein the wood member is pressed by the pressing surface and partially compressed when the collision load is initially applied thereto, so that the wood member partially enters the recessed portion, and wherein after the wood member enters the recessed portion, the wood member is pressed by the pressing surface so as to be entirely compressed.

2. A shock-absorbing mechanism disposed between a load-receiving member of a vehicle for directly receiving a collision load and a frame member of the vehicle in order to reduce the collision load applied to the frame member, which mechanism includes a cylindrical member that is configured to axially receive the collision load applied thereto via the load-receiving member so as to be axially compressed, and a wood member that is received in the cylindrical member so as to be axially compressed with the cylindrical member when the collision load is applied thereto, the wood member being capable of expanding from its compressed condition by a certain amount in a restoring direction when the collision load is released, wherein the wood member is received in the cylindrical member while an axis direction of annual rings of the wood member corresponds to an axial direction of the cylindrical member, wherein at least one of the load-receiving member and the frame member has a pressing portion for axially pressing the wood member when the collision load is applied thereto, the pressing portion having a recessed portion in which an axial end portion of the wood member is received, wherein a projection which is placed in contact with an axial end surface of the wood member contacts is formed in a bottom surface of the recessed portion, wherein the wood member is pressed by the projection formed in the recessed portion and partially compressed when the collision load is initially applied thereto, so that a portion of the wood member that does not contact the projection enters the recessed portion, and wherein after the wood member enters the recessed portion, the wood member is pressed by the pressing portion so as to be entirely compressed.

3. A shock-absorbing mechanism disposed between a load-receiving member of a vehicle for directly receiving a collision load and a frame member of the vehicle in order to reduce the collision load applied to the frame member, which mechanism includes a cylindrical member that is configured to axially receive the collision load applied thereto via the load-receiving member so as to be axially compressed, and a wood member that is received in the cylindrical member so as to be axially compressed with the cylindrical member when the collision load is applied thereto, the wood member being capable of expanding from its compressed condition by a certain amount in a restoring direction when the collision load is released, wherein the wood member is received in the cylindrical member while an axis direction of annual rings of the wood member corresponds to an axial direction of the cylindrical member, wherein at least one of the load-receiving member and the frame member has a pressing portion for axially pressing the wood member when the collision load is applied thereto, the pressing portion having a pressing surface which is placed in contact with an axial end surface of the wood member before compression due to application of the collision load, wherein the pressing portion has a space formed therein and having an opening that opens in the pressing surface, wherein the wood member is pressed by the pressing surface and partially compressed when the collision load is applied thereto, so that the wood member partially enters the space through the opening.

4. A shock-absorbing mechanism disposed between a load-receiving member of a vehicle for directly receiving a collision load and a frame member of the vehicle in order to reduce the collision load applied to the frame member, which mechanism includes a cylindrical member that is configured to axially receive the collision load applied thereto via the load-receiving member so as to be axially compressed, and a wood member that is received in the cylindrical member so as to be axially compressed with the cylindrical member when the collision load is applied thereto, the wood member being capable of expanding from its compressed condition by a certain amount in a restoring direction when the collision load is released, wherein the wood member is received in the cylindrical member while an axis direction of annual rings of the wood member corresponds to an axial direction of the cylindrical member, wherein at least one of the load-receiving member and the frame member has a pressing portion for axially pressing the wood member when the collision load is applied thereto, the pressing portion having a space in which an axial end portion of the wood member is received, wherein the end portion of the wood member is received in the space and is connected to the pressing portion via a connecting mechanism, wherein the wood member is pressed by the connecting mechanism and partially compressed when the collision load is applied thereto, so that a portion of the wood member that does not contact the connecting mechanism enters the space.

* * * * *